United States Patent [19]
Kranich

[11] Patent Number: 5,850,534
[45] Date of Patent: Dec. 15, 1998

[54] METHOD AND APPARATUS FOR REDUCING CACHE SNOOPING OVERHEAD IN A MULTILEVEL CACHE SYSTEM

[75] Inventor: Uwe Kranich, Munich, Germany

[73] Assignee: Advanced Micro Devices, Inc., Sunyvale, Calif.

[21] Appl. No.: 464,350

[22] Filed: Jun. 5, 1995

[51] Int. Cl.$^6$ .................................................. G06F 12/12
[52] U.S. Cl. ........................ 395/471; 395/449; 395/461
[58] Field of Search ................................. 395/473, 472, 395/468, 449, 446, 460, 461, 471

[56] References Cited

U.S. PATENT DOCUMENTS

| | | | |
|---|---|---|---|
| 4,797,814 | 1/1989 | Brenza | 395/403 |
| 5,136,700 | 8/1992 | Thacker | 395/449 |
| 5,369,753 | 11/1994 | Tipley | 395/449 |
| 5,530,832 | 6/1996 | So et al. | 395/449 |

OTHER PUBLICATIONS

IBM Technical Disclosure Bulletin, "Extended L2 Directory For L1 Residence Recording", vol. 34 No. 8, Jan. 92.
IBM Technical Disclosure Bulletin, vol. 36, No. 12, Dec. 1, 1993, pp. 441–445, XP000419025 "Handling Reservations in Multiple–Level Cache".

Primary Examiner—Eddie P. Chan
Assistant Examiner—Kevin L. Ellis
Attorney, Agent, or Firm—Foley & Lardner

[57] ABSTRACT

A memory system for reducing cache snooping overhead for a multilevel cache system has a highest cache level connected to a main memory and a lowest cache level connected to a processor or other memory accessing device. Each intermediate level cache is connected to a cache level one level above and below that cache. The highest cache level detects a memory access on a shared memory bus, and determines if that memory access resides in that cache. If there is a hit in that cache, the highest cache level checks a hit flag for every storage location within that highest level cache to determine if the memory access also hits a storage location within the next lower cache level. If there is a hit in the next lower cache level, that cache also checks a hit flag for every storage location within that cache to determine if the memory access also hits a storage location within the next lower cache level. This process continues until the memory access does not hit a particular cache level or until the lowest cache level is reached.

10 Claims, 5 Drawing Sheets

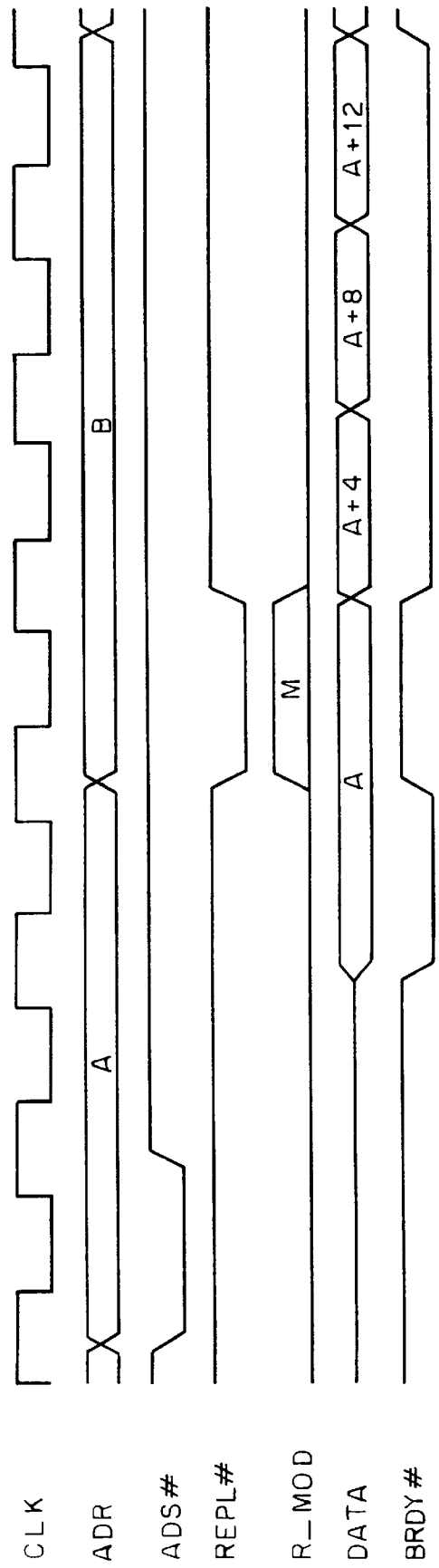

METHOD AND APPARATUS FOR REDUCING CACHE SNOOPING OVERHEAD IN A MULTILEVEL CACHE SYSTEM

BACKGROUND OF THE INVENTION

1. Field of the Invention

The present invention relates to a method and apparatus for reducing the cache access, or snooping, overhead required in a multilevel cache system to determine if a cache hit or miss occurred in each of those caches.

2. Description of the Related Art

One way to increase the performance of a computer system is to decrease the time needed to supply a processor with the information it requires from a memory by lowering the time lapse between the memory's receipt of the address from the processor and the transmission of the required information to the processor. This time lapse is determined by the "speed" of the memory. Currently, the cost of memory increases dramatically with its speed. In systems requiring large amounts of memory, the use of the fastest memory available is often cost prohibitive. Access to system memory is also slowed by delays encountered on the system data and address buses. Such delays result from limited bus bandwidth and contention for system resources.

Using a bank of relatively high-speed memory, called "cache" memory, to act as a buffer for a larger bank of slower memory, such as system (or main) memory, can improve the average information-request to information-supply speed. Specifically, in a processing system having a cache memory, the processor initially requests information it needs from the cache. If the information is stored in the cache memory, a cache hit (hit) has occurred and the requested information is provided to the processor from the cache memory at the faster rate. If the required information is not stored in the cache memory, a cache miss (miss) has occurred and the requested information is retrieved from the system memory at the slower transfer rate. One way to determine the presence or absence of information in a cache is to maintain a list of the addresses stored in the cache in a TAG array and compare the address requested by the processor with the addresses in the TAG array.

A multilevel cache system contains more than one cache level in the access path of the processor to the main memory. A processor is connected to a level 1 cache, which is connected to a level 2 cache, with itself might be connected to a level 3 cache, etc. Multiple processors using multiple cache levels can access a common main memory via a shared memory bus. This bus usually connects the caches at the highest level assigned to each processor. Each processor, including the caches for that processor, can run independently of the other processors sharing the same main memory until a processor requires data which is not in any of the caches in the access path of that processor.

Usually, each of the caches in a multi-level cache system provides "inclusion", meaning that a cache at level n+1 contains all of the addresses and data contained in the level n cache accessed by the corresponding processor. In systems having multiple levels of cache memory, if the lowest level cache experiences a cache miss, the next level cache tries to service the processor's information request from the information it has stored within. If the next higher level cache also experiences a miss, then the next higher level cache in the sequence will try to service the request. This procedure will continue until a hit occurs or until the highest level cache experiences a miss. In the case of a miss in the highest level cache, the processor's information request is serviced from the main memory.

In order to maintain consistency of information among the caches, accesses on the shared memory bus must be monitored by all of those caches which are not connected to the processor or other device performing an external access to the system memory (master processor or bus master). Such monitoring is performed by a snooping process in which each of those caches observes the external accesses and determines whether the address corresponding to the external access is an address resident in its cache, for example, by examining the TAG array. If so, a cache hit occurs and the necessary actions are taken in the corresponding cache. These actions can include invalidating that address location or reading from main memory to get the updated version of the data for that address location in the cache.

In a two level cache system, the level 2 cache snoops the external accesses over the shared memory bus. If the access does not hit the level 2 cache, inclusion of all the level 1 addresses in the level 2 cache implies that a level 1 cache miss also has occurred. Since a miss has occurred in the level 2 cache, no action need be taken in either the level 1 or level 2 cache.

When snooping results in a level 2 cache hit, a level 2 cache controller issues a snoop inquiry to the corresponding level 1 cache to determine whether the level 1 cache contains that address. If the level 1 cache snoop results in a miss, no further action is taken in the level 1 cache, and only the level 2 cache performs the required action. If the level 1 cache snoop results in a hit, the level 1 cache can perform the necessary action with respect to the address, such as invalidating that address location. In this case, when the processor subsequently accesses that address in the level 1 cache, for example in a memory read, it finds that the data is invalid, and goes on to retrieve the data from a higher level cache or from main memory.

Multi-level cache snooping protocols are disclosed in Computer Architecture: *A Quantitative Approach* (1990), chapter 8.8, by David A. Patterson and John L. Hennessy. For example, on page 471, Patterson and Hennessy disclose how caches are updated in a multi-level cache system using multiple processors. There are four possible cache update situations: 1) a read miss, in which a processor requests a read from memory, and the requested address does not reside in any cache; 2) a read hit, in which a processor requests a read from memory and the requested address does reside in a cache assigned to that processor; 3) a write miss, in which a processor writes to memory, and the address to be written does not reside in any cache; and 4) a write hit, in which a processor writes to memory, and the address to be written does reside in a cache assigned to that processor. A read hit does not change the state of the cache. If a read miss occurs, data corresponding to that address location in the cache is written back to the main memory if it has been updated by the processor. Each of the other caches snoop on the read miss to see if the address is in its cache. If a cache has the address and is in the Read/Write state, the data corresponding to that address is written to memory and that address is changed to the invalid state. The processor requesting the read that generated the read miss retrieves the current data from main memory. The updated data is placed in a cache for that processor.

If a processor writes into an address location, and a write hit occurs, an invalidate signal goes out over the bus. Each of the other caches monitors the bus and checks to see if it has the address. If so, the cache invalidates that address. In the case of a write miss, each of the caches with the address goes to the invalid state.

Each snoop of the level 1 cache in a multi-level cache system requires that the TAG array of the level 1 cache be accessed. If the TAG array is single ported, each snoop stalls the processor's access to the level 1 cache, resulting in lower performance. This problem is compounded as the number of levels in the multi-level cache system increases.

SUMMARY OF THE INVENTION

In view of the limitations of the related art, it is an object of the invention to provide a method and apparatus for an improved multilevel cache system which reducing cache snooping overhead.

It is another object of the invention to avoid unnecessary snooping of lower level caches.

According to one aspect of the present invention, a memory system has a processor or other memory accessing device, and a level 1 cache connected to the processor to service its memory requests. There is also a level 2 cache, connected to the level 1 cache and a main memory. The level 2 cache services memory requests from the processor that the level 1 cache cannot service. The level 2 cache contains a level 1 hit array for each storage location within the level 2 cache. This level 1 hit array indicates whether the information within a particular storage location within the level 2 cache also resides in the level 1 cache assigned to the same processor.

According to another aspect of the invention, a memory system has a processor and multiple levels of cache assigned to that processor, wherein the number of cache levels is greater than two. The level 1 cache is operatively connected to the processor, the level 2 cache is operatively connected to the level 1 cache and higher level caches are operatively connected next lower level cache. The highest level cache, called level n, is connected to the level n-1 cache and the main memory. Each cache level greater than level one contains a hit array for each storage location within the cache. This hit array indicates whether the information at a particular storage location in the current level cache also resides in the cache one level below the current level cache in the chain of caches assigned to the same processor.

According to another aspect of the invention, a multi-level cache system for reducing snooping overhead includes a highest level cache connected to a shared memory bus. This highest level cache includes a means for monitoring the shared memory bus for external memory accesses.

According to the invention, when a cache hit occurs, an appropriate action is taken by the cache, such as setting an invalidation flag for that address location in the cache. The hit flag for that address is checked to determine if that address on the shared memory bus is also in the cache one level below the level of the current cache. If so, the highest level cache notifies the cache one level below it by a notification means to take appropriate action with respect to that address in that level cache as well.

Each cache level, except for the lowest level cache, has a hit flag update array, which is used to keep track of the memory addresses that currently are in the cache one level below it. If that a memory hit occurs in a cache and the hit flag indicates that the address is not in the cache at the next lowest level, no action need be taken in the lower level cache. As a result, there is no snoop of the lower level cache by the higher level cache. This reduces the snooping overhead in a multi-level cache system.

BRIEF DESCRIPTION OF THE DRAWINGS

The invention, together with further objects and advantages thereof, may best be understood by making reference to the following description taken in conjunction with the accompanying drawings, in the several figures of which like reference numerals identify like elements, and wherein:

FIG. 5 shows the signals and timings used in a replacement address cycle according to the invention.

DETAILED DESCRIPTION OF THE PREFERRED EMBODIMENTS

Figure 1:
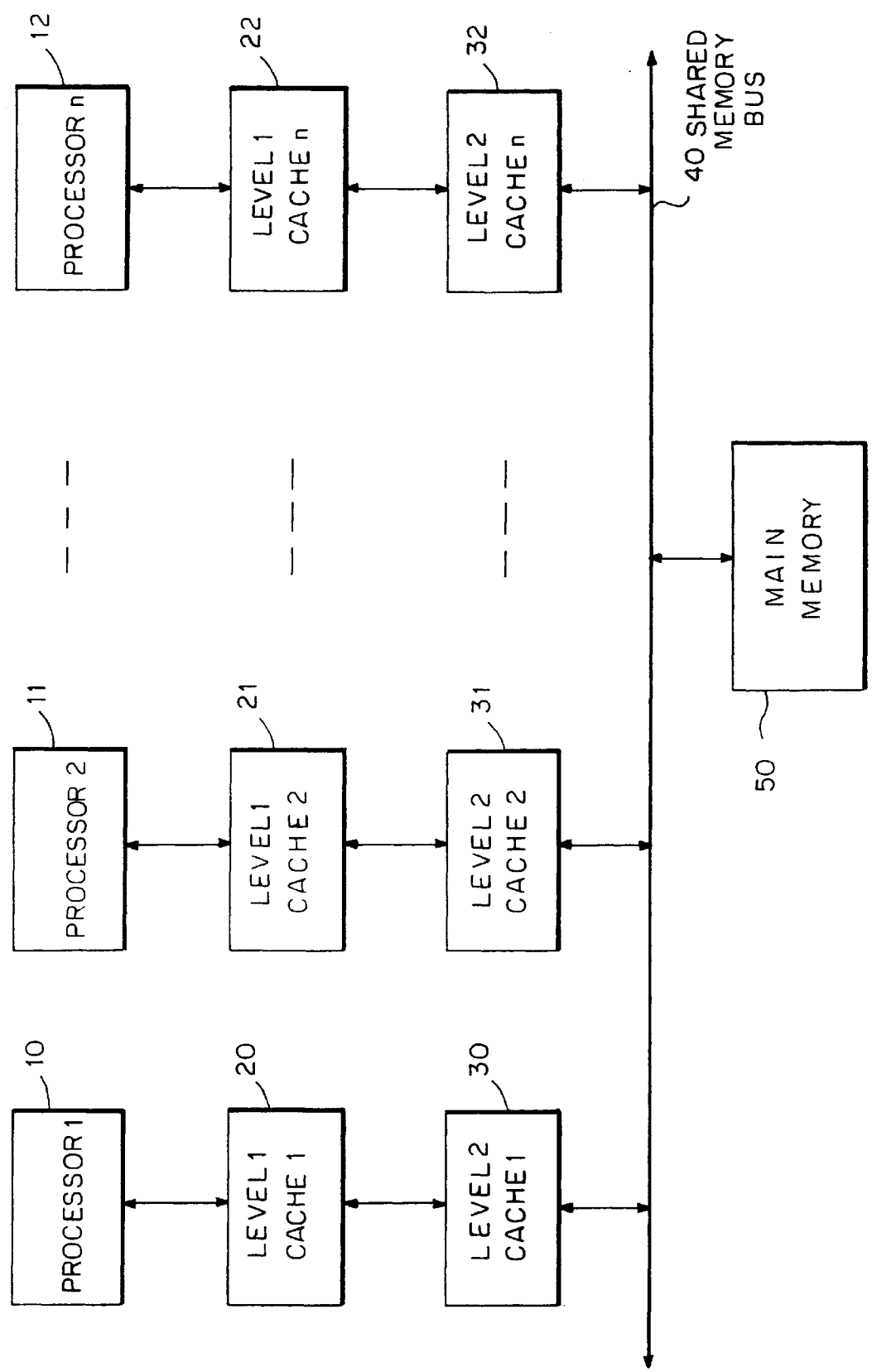
FIG. 1 illustrates in block diagram form a two-level cache system in a multi-processor environment according to the preferred embodiment of the invention.

The invention is disclosed herein in the context of a two level cache system by way of illustration and not limitation, and it will be known to those of ordinary skill that the invention is equally applicable to multilevel cache systems containing multiple levels of caches. FIG. 1 shows a two-level cache memory system including a processor or other memory accessing device 10, a level 1 cache 20, a level 2 cache 30, a shared memory bus 40, and a main memory 50. Multiple processors or other memory accessing devices 11, 12 can be connected to the main memory 50 via their own two-level cache systems 21, 31, 22, 32. Any number of such processors and caches can be configured as shown in FIG. 1.

Figure 2:
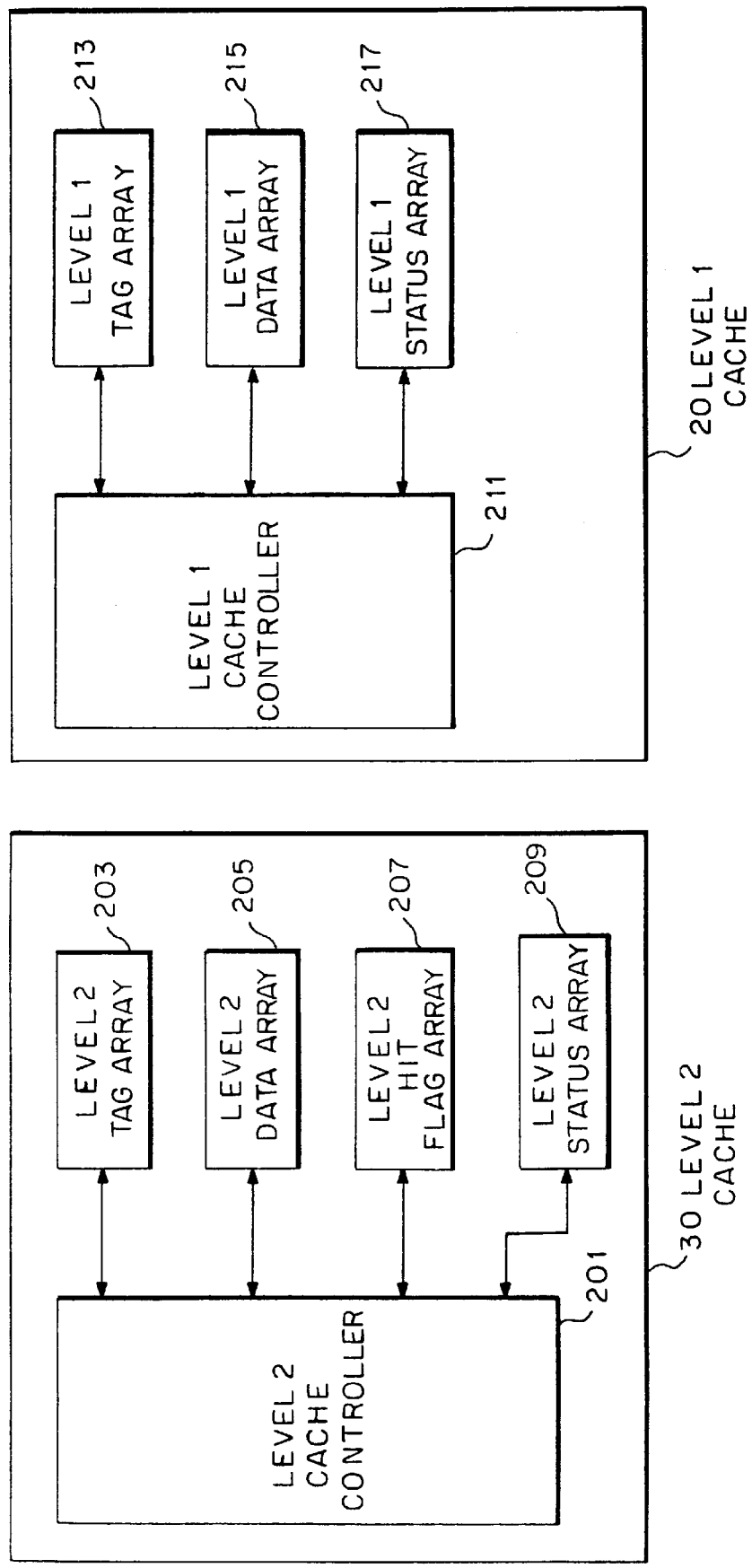
FIG. 2 illustrates in block diagram form the elements of a level 1 and level 2 cache according to the preferred embodiment of the invention.

When a processor, for example, processor 10, requests information from an address in main memory 50, the corresponding level 1 cache 20 first checks to see if that address is stored therein. This check can be accomplished under the control of a cache controller 211 as shown in FIG. 2, by comparing the requested address to addresses listed in a TAG array 213, which is a stored array including a list of addresses stored in the level 1 cache 20. Referring back to FIG. 1, if the level 1 cache 20 does not have the requested address in any of its storage locations, the level 2 cache 30 will next try to service the processor address request. If the level 2 cache 30 does not have that address in any of its storage locations, the processor's address request is serviced by accessing the requested address from main memory 50.

FIG. 2 shows the elements of a level 1 cache 20 and a level 2 cache 30. The level 1 cache 20 contains a cache controller 211, a cache data memory 215 for storing data in the level 1 cache 20, a TAG status array 213 for indicating which addresses of main or system memory 50 are stored in the level 1 cache 20, and a status array 217 indicating which data stored in the level 1 cache 20 is valid. The level 2 cache 30 contains corresponding elements, including cache data memory 205, a TAG status array 203 indicating which addresses of the main or system memory 50 are stored in the level 2 cache 30, and a status array 209 indicating which data stored in the level 2 cache 30 is valid.

By inclusion, all of the addresses stored in the level 1 cache 20 are stored in the level 2 cache 30. However, conventional systems do not provide any indication in the level 2 cache 30 of whether a line (i.e., a memory address and corresponding data) stored in the level 2 cache 30 is also stored in the level 1 cache 20. Thus, according to the invention, level 2 cache 30 also contains a hit array 207. Hit array 207 contains a flag for each line in the level 2 cache 30 indicating whether or not that line is also stored in the level 1 cache 20. For cache systems with more than two levels, all cache levels greater than level one have a structure exactly like that of the level 2 cache 30. In each case, a hit flag for each line stored in the cache exists in the hit array of the cache to indicate whether or not the memory address corresponding to that line also resides in the next lower level cache assigned to the same processor. As discussed further herein, the incorporation of a hit array according to the invention reduces the need for snooping by the higher level caches to the lower level caches.

Referring back to FIG. 1, each highest level cache 30, 31, 32 in each hierarchy of cache memories detects an external memory access over the shared memory bus 40 resulting from a request not serviced by another processor's cache. Each highest level cache 30, 31, 32 then determines if the address of the external memory access corresponds to an address residing in its cache by comparing the memory address accessed against the addresses in the TAG status array 203 (see FIG. 2) for every storage location within that cache. If there is no match, no action is taken by that cache. Further, since by inclusion the highest level cache includes all the addresses of the lower level caches, no action need be taken by any of the lower level caches assigned to the same processor.

If the address of the external memory access results in a hit in the TAG status array, i.e., the external memory address accessed matches an entry in the TAG status array of the highest level cache, the highest level cache takes appropriate action, for example, invalidating the corresponding address. In addition, according to the invention, the highest level cache controller checks the corresponding entry in hit array for the address that matches the external memory access. If the entry indicates that the address corresponding to the external memory access also is currently in the cache one level immediately below the highest level cache, the cache one level below is notified by the highest level cache controller to take appropriate action with respect to that address in the next lower level cache.

The process continues until the hit array indicates that the address of the external memory access is not found in the next lower level cache. If this indication does not occur, the process continues all the way down the cache hierarchy until the level 1 cache is reached. The incorporation of the hit array into each cache at levels other than level 1 provides an immediate indication of whether or not the accessed address is in the next lower level cache, thereby eliminating the need for the higher level cache to snoop the TAG status array of the lower level cache to determine if the accessed address is present in the lower level cache.

As a result, a higher level cache can often execute the necessary actions without accessing the next lower level cache at all. For example, for a level 1 cache (L1 cache) 20 having a size of 8 KBytes and a level 2 cache (L2 cache) 30 having a size of 128 KBytes, there is a high probability that a line in the L2 cache 30 is not contained in the L1 cache 20. With the hit array 207 according to the invention indicating which lines in the L2 cache 30 are found in the L1 cache 20, it is not necessary to snoop into the L1 cache 20 to determine if one of the larger number of lines in the L2 cache 30 is also stored in the much smaller L1 cache 20. This reduces snooping overhead and improves system performance by reducing the time spent snooping the lower level caches.

Figure 3:
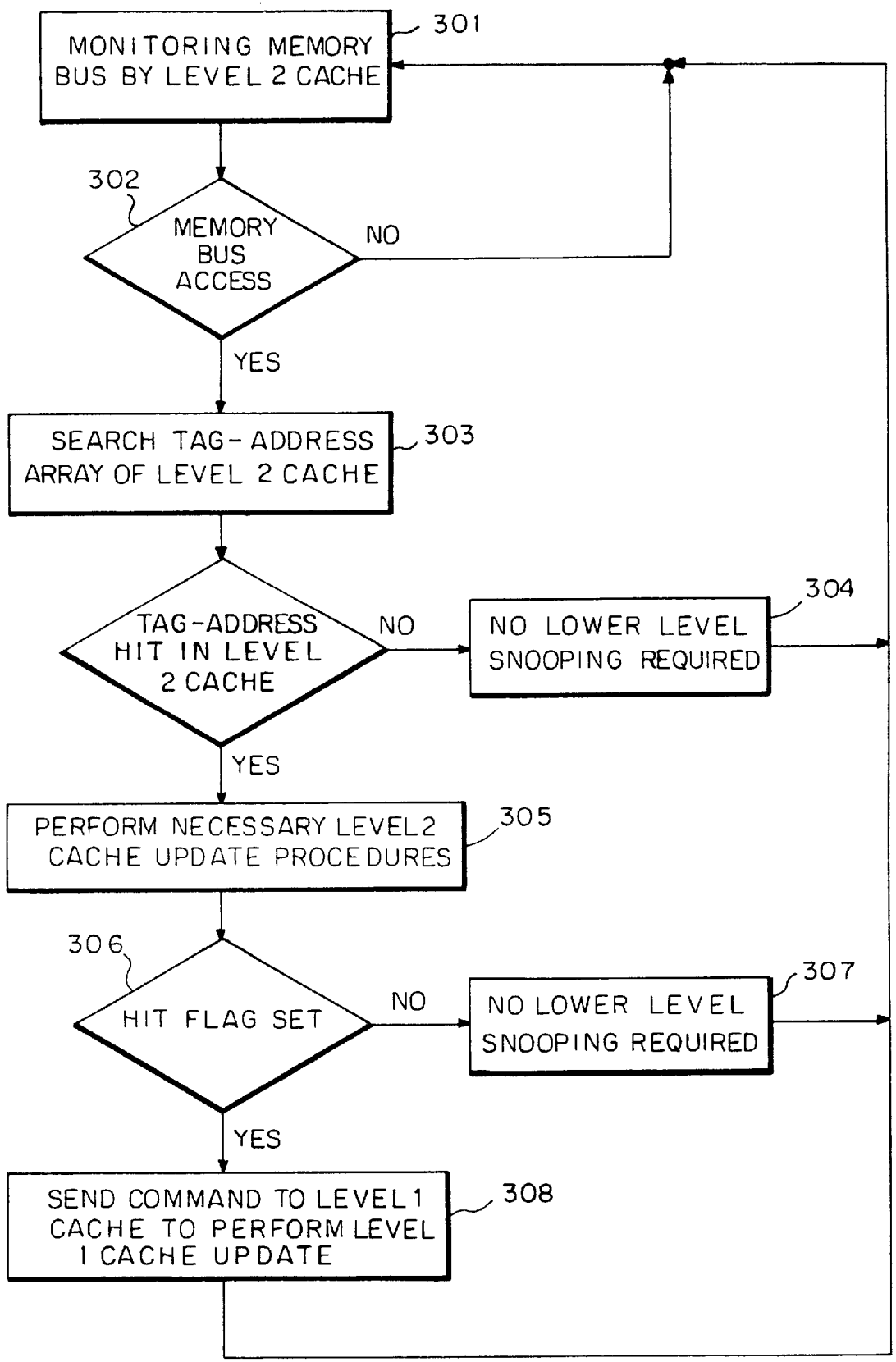
FIG. 3 is a flow diagram of the method used to reduce the cache snooping overhead.

A flow diagram of the method according to the invention for a two level cache hierarchy is shown in FIG. 3. In step 301, the level 2 cache monitors the shared memory bus for memory accesses. When an external memory access occurs, as in step 302, the level 2 cache checks the address of the memory access against all of the tag-addresses stored in the level 2 cache, as in step 303. One way this can be accomplished is by comparing the memory access address to the addresses in the TAG status array, as previously discussed herein. If there is no tag-address hit within the level 2 cache, then no further action needs to be taken with respect to that memory access, as shown in step 304. If a tag-address hit occurs within the level 2 cache, then the level 2 cache must perform some required cache update operations with respect to the storage location corresponding to the tag-address hit, as shown in step 305. These update operations may include setting a status flag to invalid for that storage location, or performing a memory read operation in order to obtain the most current version of the information corresponding to that memory access hit from the main memory. If there is a hit in the level 2 cache, the level 2 cache also checks the hit array for the entry corresponding to the storage location that was hit, as shown in step 306. If the hit array indicates that this tag-address is not also in the level 1 cache, there is no need to snoop the level 1 cache and no further faction is taken, as shown as in step 307. If the hit array flags that the accessed address is also in the level 1 cache, then the level 2 cache controller sends a command to the level 1 cache to update the storage location within the level 1 cache corresponding to the memory access, as shown in step 308. This procedure as described above is for a two-level cache system, but will work equally as well for multilevel cache systems of greater than two levels.

The hit array according to the invention is not limited to any particular implementation. For example, a separate array can be formed with each address in the cache having a corresponding flag having a first state indicating that the line is also in the next lower level cache and a second state indicating that the corresponding line is not in the next lower level cache. Alternatively, the hit array can be implemented simply by adding such a flag to each of the entries in the TAG status array.

For the system according to the invention to operate properly, the higher level cache, e.g., the L2 cache 30, must monitor the activity in the lower level cache, e.g., the L1 cache 20, in order to determine what lines actually are in the lower level cache. New lines are added to the L1 cache 20 only during a cache line fill operation. Such a cache line fill can be easily monitored by the L2 cache controller 201 (see FIG. 2), because during such a cache line fill, the L1 cache 20 usually generates the required addresses for the cache line fill to be completed, and thereby the L2 cache 30 can read these required addresses off of the appropriate bus and update its hit array 207 accordingly. Detecting the removal of a line from the L1 cache 20, such as by cache line replacement, requires additional steps, since the L1 cache 20 typically does not indicate when a line is replaced. According to the invention, such changes can be detected either by employing dummy snoops or by a replacement address cycle.

If no special cycle is used to detect removal or replacement of a line from the lower level L1 cache 20, the higher level L2 cache hit array 207 has more lines indicating a hit than actually are present in the L1 cache 20. Snoops generated by the L2 cache controller 201 to such addresses in the L1 cache 20 result in a miss, because the address is not actually present in the L1 cache 20. Such snoops can be termed dummy snoops. The L2 cache 30 detects the miss and sets the corresponding entry in the L2 hit array 207 to indicate that the line is not present in the L1 cache 20. As a result, further snoops into the L1 cache 20 are eliminated.

Since this approach does not require any monitoring of replacement activity in the lower level cache, it is easy to implement. Although such dummy snoops reduce the number of snoops to the L1 cache 20 by eliminating the need to snoop the L1 cache 20 after a miss occurs, the occurrence of misses in the snooping process suggests that further performance improvement is possible. Such performance improvement is achieved by employing a replacement address cycle according to the invention. In such a replacement address cycle, during a cache line refill, the lower level cache indicates which line it is going to replace, as discussed further herein, thereby eliminating the occurrence of dummy snoops.

Figure 4:
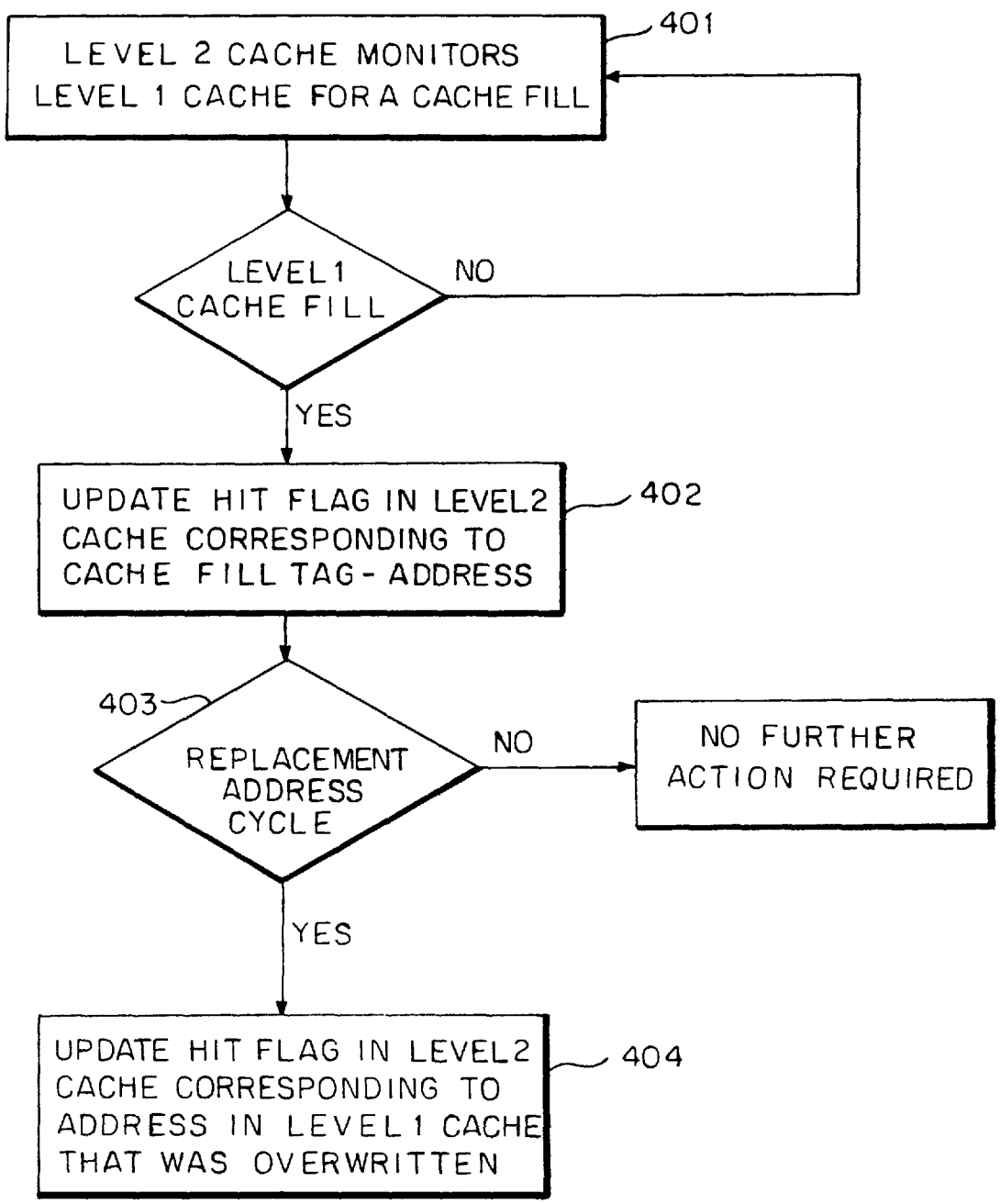
FIG. 4 is a flow diagram of the method used to update the hit flag array.

FIG. 4 illustrates a method in which the level 2 cache keeps its hit array current in order to determine whether or not a level 1 cache snoop is required. In step 401, the level 2 cache monitors the level 1 cache for a level 1 cache line fill. A level 1 cache line fill occurs when an address from main memory is read into the level 1 cache. When the level 2 cache detects a level 1 cache line fill, the level 2 cache updates the flag in the hit array corresponding to the address read into the level 1 cache to indicate that this address also resides within the level 1 cache, as shown in step 402. Due to inclusion, all main memory writes to the level 1 cache also get written into the level 2 cache. Thus, a level 1 cache fill always results in setting a hit flag in the level 2 cache.

In a replacement address cycle according to the invention, as shown in step 403, the L1 cache generates the starting address of the cache line fill. The L1 cache then puts the address of the line being replaced on the external memory address bus and indicates whether or not the line is going to be replaced. A line is being replaced if a signal (REPL#) is asserted after the first data word has been transferred. REPL# is asserted when the replacement address B is put on the address bus, as shown in FIG. 5. If no line is being replaced, REPL# is not asserted at all. In this way, the L2 cache controller can determine which line in the L1 cache is being replaced, and reset the corresponding flag in the L1 hit array stored in the L2 cache. Using the starting address, the L2 cache controller generates the cache line fill address sequence by itself.

In another aspect according to the invention, another signal RMOD can be produced to indicate whether or not the line being replaced is modified. This signal can be used by an external controller to detect whether or not a copyback access will follow. In a copyback, a request is transmitted to the cache controller to copy back a specific line from the cache to the external bus to be written into main memory. As shown in FIG. 5, RMOD is valid at the same time that REPL# is asserted. RMOD is not valid if REPL# is not asserted.

It is to be understood that although the characteristics and advantages of the present invention have been set forth in the foregoing description, the disclosure is illustrative only. All of the variations discussed above, as far as they are within the true intention and scope of this invention, are included in the claims.

What is claimed is:

1. A memory system, comprising:

a memory accessing device;

a level 1 cache operatively connected to said memory accessing device, said level 1 cache containing a plurality of storage locations;

a level 2 cache operatively connected to said level 1 cache and a main memory, said level 2 cache containing a plurality of storage locations and a hit flag corresponding to each of said plurality of storage locations in said level 2 cache, said hit flag being indicative of whether information stored in a corresponding one of said plurality of storage locations in said level 2 cache is also stored in said level 1 cache; and a replacement address line operatively connected to said level 1 cache and said level 2 cache, said replacement address line being indicative of a cache line replacement with respect to said level 1 cache when said replacement address line is in a first state, said replacement address line being indicative of no cache line replacement when said replacement address line is in a second state.

2. A memory system as recited in claim 1, further comprising an address bus operatively connected to said level 1 cache and said level 2 cache, wherein, when the address bus is placed into a first state to indicate a valid address on the address bus corresponding to a first memory address to be written into the level 1 cache, the replacement address line is thereafter placed into the first state, and a second memory address on the address bus that appears concurrently with the replacement address line being in the first state corresponds to a memory address that has associated data currently stored within the level 1 cache, but which is to be overwritten in the level 1 cache by data associated with the first memory address.

3. A memory system as recited in claim 2, further comprising a modification line operatively connected to said level 1 cache and said level 2 cache, the modification line being indicative of corresponding data of the cache line replacement having been modified in said level 1 cache by the memory accessing device.

4. A memory system as recited in claim 3, wherein, when the modification line indicates the modification of the corresponding data by the memory accessing device during the cache line replacement, a copyback cycle to a main memory is performed to ensure data integrity.

5. A memory system as recited in claim 1, wherein when said replacement address line is in the first state, a memory address associated with data that is currently stored in one of said plurality of storage locations in said level 1 cache but which is to be overwritten with other data is output on an address bus operatively connected to said level 1 cache and said level 2 cache, and wherein said level 2 cache updates the corresponding hit flag for the associated address of the overwritten data in said level 2 cache as a result.

6. In a processing system having a processor, wherein said processor generates an address representative of required data, having a multilevel cache system connected to said processor, having a shared memory bus connected to a main memory and said multilevel cache system, said multilevel cache system comprising:

a level 1 cache that supplies information in response to an address request from said processor, said level 1 cache operatively connected with said processor for receiving said address request from said processor, said level 1 cache including a plurality of storage locations for storing data, and a TAG array indicating addresses stored in said level 1 cache;

level 2 through level i caches connected in a series arrangement, where i is an integer from 3 to n, said level 2 cache being connected to said level 1 cache as a lower level cache and being connected to said level 3 cache as a next high level cache, each of said level 2 through level i caches attempting to supply information in response to an address request from said processor when all lower level caches cannot supply the information, each of said level 2 through said level i caches including a plurality of storage locations for storing data, a TAG array indicating addresses stored in said corresponding cache and a hit flag for each of said plurality of storage locations in said corresponding cache, said level i cache being operatively connected to said main memory over said shared memory bus;

monitoring means in said level i cache for detecting a memory access to said main memory over said shared memory bus;

lower level cache notification means in each of said level 2 through level i caches for notifying a next lower level cache that said memory access coincides with one of said plurality of storage locations in said next lower level cache;

hit flag update means in each of said level 2 through level i caches for updating a hit flag corresponding to one of said plurality of storage locations in said corresponding cache; and a replacement address line operatively connected to each of said level 1 through level i caches, said replacement address line being indicative of a cache line replacement with respect to one of said level 1 through level i caches when said replacement address line is in a first state, said replacement address line being indicative of no cache line replacement when said replacement address line is in a second state, said replacement address line also being indicative of which of said level 1 through level i caches is performing the cache line replacement when the replacement address line is in the first state, wherein when said replacement address line is in the first state, a memory address associated with data that is currently stored in one of said plurality of storage locations in said corresponding cache that is performing the cache line replacement but which is to be overwritten with other data is output on an address bus operatively connected to each of said level 1 through level i cache, and wherein each of said caches higher in the series arrangement of said level 2 cache through level i cache updates its corresponding hit flag for the associated address of the overwritten data in said corresponding level 2 cache through level i cache.

7. In a processing system as recited in claim 6, wherein, when said address bus is placed into a first state to indicate a valid address on said address bus corresponding to a first memory address to be written into said one of said level 1 through level i cache which is performing the cache line replacement, the replacement address line is thereafter placed into the first state, and a second memory address on said address bus that appears concurrently with the replacement address line being in the first state corresponds to a memory address that has associated data currently stored within said one of said level 1 through level i cache, but which is to be overwritten in said one of said level 1 through level i caches by data associated with said first memory address.

8. In a processing system as recited in claim 7, further comprising a modification line operatively connected to each of said level 1 through level i cache, the modification line being indicative of corresponding data of the cache line replacement having been modified in said one of said level 1 through level i cache by said processor.

9. A processing system as recited in claim 8, wherein, when the modification line indicates the modification of the corresponding data by said processor during the cache line replacement, a copyback cycle to said main memory is performed to ensure data integrity.

10. A method of reducing cache snooping overhead in a multi-level cache system with a processor and a main memory, the method comprising the steps of:

monitoring a shared memory bus with a highest level cache, and detecting a memory access on said shared memory bus, with said highest level cache comparing said memory access to a tag-address for each of a plurality of storage locations in said level highest level cache, with said level highest level cache, notifying a next lower level cache that said memory access coincides with one of said tag-addresses stored within said next lower level cache, with said highest level cache updating a hit flag corresponding to one of a plurality of storage locations in said highest level cache, wherein said hit flag indicates whether information currently stored in one of said plurality of storage locations in said highest level cache is also currently stored in said next lower level cache, replacing a cache line within said next lower level cache and notifying the highest level cache being performed in a replacement address cycle by the following steps:

a) placing a first address on an address bus corresponding to a memory address associated with data to be placed into said next lower level cache, b) placing an address valid signal into a state indicating a valid address on the address bus concurrently with the step a), c) placing a second address on the address bus corresponding to another memory address associated with data to be written over in said next lower level cache, and d) reading the second address by said highest level cache so as to update the high flag corresponding the second address in said highest level cache as a result.

* * * * *